US008649472B1

(12) United States Patent
Nabar et al.

(10) Patent No.: US 8,649,472 B1
(45) Date of Patent: Feb. 11, 2014

(54) METHOD AND APPARATUS FOR IMPROVING CHANNEL ESTIMATION

(71) Applicant: Marvell International Ltd., Hamilton (BM)

(72) Inventors: Robhit U. Nabar, Sunnyvale, CA (US); Arul Durai Murugan Palanivelu, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 13/758,733

(22) Filed: Feb. 4, 2013

Related U.S. Application Data

(63) Continuation of application No. 12/580,809, filed on Oct. 16, 2009, now Pat. No. 8,369,471.

(60) Provisional application No. 61/107,145, filed on Oct. 21, 2008.

(51) Int. Cl.
*H04B 1/00* (2006.01)
(52) U.S. Cl.
USPC ............ 375/350; 375/343; 375/340; 375/324
(58) Field of Classification Search
USPC .................................. 375/350, 343, 340, 324
See application file for complete search history.

(56) References Cited

U.S. PATENT DOCUMENTS 7,460,876 B2 * 12/2008 Sadri et al. ..................... 455/522
2003/0043733 A1 * 3/2003 Maeda et al. .................. 370/210
2006/0039331 A1 2/2006 Abeta et al.
2007/0188381 A1 * 8/2007 Bocquet et al. ............... 342/377
2008/0051095 A1 2/2008 Chang et al.

OTHER PUBLICATIONS

IEEE Std 802.11a-1999 (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 GHZ Band," *The Institute of Electrical and Electronics Engineers, Inc.*, (1999).

IEEE Std 802.11g/D8.2, Apr. 2003 (Supplement to ANSI/IEEE Std 802.11, 1999 (Reaff 2003)) "Draft Supplement to Standard [for] Information technology—Telecommunications and information exchange between systems—Local and metropolitan area networks—Specific requirements, Part 11: Wireless LAN Medium Access Control (MAC) and Physical Layer (PHY) specifications: Further Higher Data Rate Extension in the 2.4 GHz Band, "*The Institute of Electrical and Electronics Engineers, Inc.*, Apr. 2003.

S. A. Mujtaba, "IEEE P802.11—Wireless LANS, TGn Sync Proposal Technical Specification," *The Institute of Electrical and Electronics Engineers, Inc.*, doc.: IEEE 802.11-04/0889r6, May 2005.

(Continued)

*Primary Examiner* — Kabir A Timory

(57) ABSTRACT

A plurality of sub-channel response estimates corresponding to a plurality of contiguous sub-channels in a communication channel are determined, and a plurality of weight coefficients are determined. The plurality of sub-channel response estimates are multiplied with the plurality of weight coefficients to generate a plurality of weighted sub-channel response estimates. A filtered sub-channel response estimate for one of the plurality of contiguous sub channels is generated using the plurality of weighted sub-channel response estimates.

22 Claims, 3 Drawing Sheets

(56) References Cited

OTHER PUBLICATIONS

IEEE Std 802.11b-2001 (Corrigendum to IEEE Std 802.11b-1999) "IEEE Standard for Information technology—Telecommunications and information exchange between systems—Local and metropolitan area networks—Specific requirements, Part 11: Wireless LAN Medium Access Control (MAC) and Physical Layer (PHY) specifications, Amendment 2: Higher-speed Physical Layer (PHY) extension in the 2.4 GHz band-Corrigendum 1," *The Institute of Electrical and Electronics Engineers, Inc.*, Nov. 7, 2001.

International Standard, ISO/IEC 8802-11, ANSI/IEEE Std 802.11, "Information technology—Telecommunications and information exchange between systems—local and metropolitan area networks—specific requirements" Part 11: Wireless LAN Medium Access Control (MAC) and Physical Layer (PHY) specifications, *The Institute of Electrical and Electronics Engineers, Inc.*, (1999).

* cited by examiner

METHOD AND APPARATUS FOR IMPROVING CHANNEL ESTIMATION

CROSS-REFERENCE TO RELATED APPLICATION

This application is a continuation of U.S. application Ser. No. 12/580,809, now U.S. Pat. No. 8,369,471, filed Oct. 16, 2009, entitled "Method and Apparatus for Improving Channel Estimation," which claims the benefit of U.S. Provisional Patent Application No. 61/107,145, entitled "Technique to Improve Channel Estimation Performance for WLAN," which was filed on Oct. 21, 2008. Both of the applications referenced above are hereby incorporated by reference herein in their entireties.

FIELD OF THE DISCLOSURE

The present disclosure relates generally to communication systems and, more particularly, to estimating a communication channel.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

An ever-increasing number of relatively inexpensive, low power wireless data communication services, networks and devices have been made available over the past number of years, promising near wire speed transmission and reliability. Various wireless technologies are described in detail in the 802.11 IEEE Standard, including for example, the IEEE Standard 802.11 (1999) and its updates and amendments, the IEEE Standard 802.11a/g (2003), as well as the IEEE Standard 802.11n now in the process of being adopted, all of which are collectively incorporated herein fully by reference. These standards have been or are in the process of being commercialized with the promise of 54 Mbps or more effective bandwidth, making them a strong competitor to traditional wired Ethernet and the more ubiquitous "802.11b" 11 Mbps mobile wireless transmission standard.

Generally speaking, transmission systems compliant with the IEEE 802.11a and 802.11g or "802.11a/g" standards as well as the 802.11n standard achieve their high data transmission rates using Orthogonal Frequency Division Modulation or OFDM encoded symbols mapped up to a 64 quadrature amplitude modulation (QAM) multi-carrier constellation. In a general sense, the use of OFDM divides the overall system bandwidth into a number of frequency sub-bands or channels, with each frequency sub-band being associated with a respective sub-carrier upon which data may be modulated. Thus, each frequency sub-band of the OFDM system may be viewed as an independent transmission channel within which to send data, thereby increasing the overall throughput or transmission rate of the communication system.

Transmitters used in the wireless communication systems that are compliant with the aforementioned 802.11a/802.11g/802.11n standards typically perform multi-carrier OFDM symbol encoding (which may include error correction encoding and interleaving), convert the encoded symbols into the time domain using Inverse Fast Fourier Transform (IFFT) techniques, and perform digital to analog conversion and conventional radio frequency (RF) upconversion on the signals. These transmitters then transmit the modulated and upconverted signals after appropriate power amplification to one or more receivers, resulting in a relatively high-speed time domain signal with a large peak-to-average ratio (PAR).

Likewise, the receivers used in the wireless communication systems that are compliant with the aforementioned 802.11a/802.11g/802.11n IEEE standards typically include an RF receiving unit that performs RF downconversion and filtering of the received signals (which may be performed in one or more stages), and a baseband processor unit that processes the OFDM encoded symbols bearing the data of interest. The digital form of each OFDM symbol presented in the frequency domain is recovered after baseband downconverting, conventional analog to digital conversion and Fast Fourier Transformation of the received time domain analog signal. Thereafter, the baseband processor performs demodulation (phase rotation) and frequency domain equalization (FEQ) to recover the transmitted symbols, and these symbols are then processed in a Viterbi decoder to estimate or determine the most likely identity of the transmitted symbol. The recovered and recognized stream of symbols is then decoded, which may include deinterleaving and error correction using any of a number of known error correction techniques, to produce a set of recovered signals corresponding to the original signals transmitted by the transmitter.

In wireless communication systems, the RF modulated signals generated by the transmitter may reach a particular receiver via a number of different propagation paths, the characteristics of which typically change over time due to the phenomena of multi-path and fading. Moreover, the characteristics of a propagation channel differ or vary based on the frequency of propagation. To compensate for the time varying, frequency selective nature of the propagation effects, and generally to enhance effective encoding and modulation in a wireless communication system, each receiver of the wireless communication system may periodically develop or collect channel state information (CSI) for each of the frequency channels, such as the channels associated with each of the OFDM sub-bands discussed above. Generally speaking, CSI is information describing one or more characteristics of each of the OFDM channels (for example, the gain, the phase, SNR, etc., of each channel). Upon determining the CSI for one or more channels, the receiver may send this CSI back to the transmitter, which may use the CSI for each channel to precondition the signals transmitted using that channel so as to compensate for the varying propagation effects of each of the channels.

To increase the number of signals which may be propagated in a communication system and/or to compensate for deleterious effects associated with multiple propagation paths, and to thereby improve transmission performance, it is known to use multiple transmit and receive antennas within a wireless transmission system. Such a system is commonly referred to as a multiple-input, multiple-output (MIMO) wireless transmission system and is specifically provided for within the 802.11n IEEE Standard now being adopted. As is known, the use of MIMO technology produces significant increases in spectral efficiency and link reliability, and these benefits generally increase as the number of transmission and receive antennas within the MIMO system increases.

In addition to the frequency channels created by the use of OFDM, a MIMO channel formed by the various transmit and receive antennas between a particular transmitter and a particular receiver includes a number of independent spatial channels. As is known, a wireless MIMO communication system can provide improved performance (e.g., increased transmission capacity) by utilizing the additional dimensionalities created by these spatial channels for the transmission of additional data. Of course, the spatial channels of a wideband MIMO system may experience different channel conditions (e.g., different fading and multi-path effects) across the overall system bandwidth and may therefore achieve different SNRs at different frequencies (i.e., at the different OFDM frequency sub-bands) of the overall system bandwidth. Consequently, the number of information bits per modulation symbol (i.e., the data rate) that may be transmitted using the different frequency sub-bands of each spatial channel for a particular level of performance may differ from frequency sub-band to frequency sub-band.

However, instead of using the different transmit and receive antennas to form separate spatial channels on which additional information is sent, better reception properties can be obtained in a MIMO system by using each of the various transmit antennas of the MIMO system to transmit the same signal while phasing (and amplifying) this signal as it is provided to the various transmission antennas to achieve beamforming (also referred to as "beamsteering"). Generally speaking, beamforming creates a spatial gain pattern having one or more high gain lobes or beams (as compared to the gain obtained by an omni-directional antenna) in one or more particular directions, while reducing the gain over that obtained by an omni-directional antenna in other directions. If the gain pattern is configured to produce a high gain lobe in the direction of each of the receiver antennas, the MIMO system can obtain better reception reliability between a particular transmitter and a particular receiver, over that obtained by single transmitter-antenna/receiver-antenna systems.

Another communication technique that exploits multiple antennas is commonly referred to as space-time block coding. Space-time block coding generally involves the transmission of multiple redundant copies of data to compensate for fading and thermal noise in the hope that some of the copies arrive at the receiver in a better state than others. The data stream to be transmitted is encoded in blocks, which are distributed among spaced antennas and across time. While space-time block encoding requires multiple transmit antennas, it is not necessary to have multiple receive antennas, although to do so improves performance.

SUMMARY

In one embodiment, a method includes determining a plurality of sub-channel response estimates corresponding to a plurality of contiguous sub-channels in a communication channel, and determining a plurality of weight coefficients. The method also includes multiplying the plurality of sub-channel response estimates with the plurality of weight coefficients to generate a plurality of weighted sub-channel response estimates, and generating a filtered sub-channel response estimate for one of the plurality of contiguous sub channels using the plurality of weighted sub-channel response estimates.

In another embodiment, an apparatus comprises a channel estimator to determine a plurality of sub-channel response estimates corresponding to a plurality of contiguous sub-channels in a communication channel, and a channel estimate filter. The channel estimate filter comprises a weight coefficient generator to generate a plurality of weight coefficients, and a filter to generate filtered sub-channel response estimates using the plurality of weight coefficients and the plurality of sub-channel response estimates.

In yet another embodiment, a method includes determining a plurality of sub-channel response estimates corresponding to a plurality of contiguous sub-channels in a communication channel, and determining a plurality of weight coefficients. The method also includes generating a plurality of filtered sub-channel response estimates for at least some of the plurality of contiguous sub-channels using the plurality of sub-channel response estimates and the plurality of weight coefficients.

DETAILED DESCRIPTION

Figure 1:
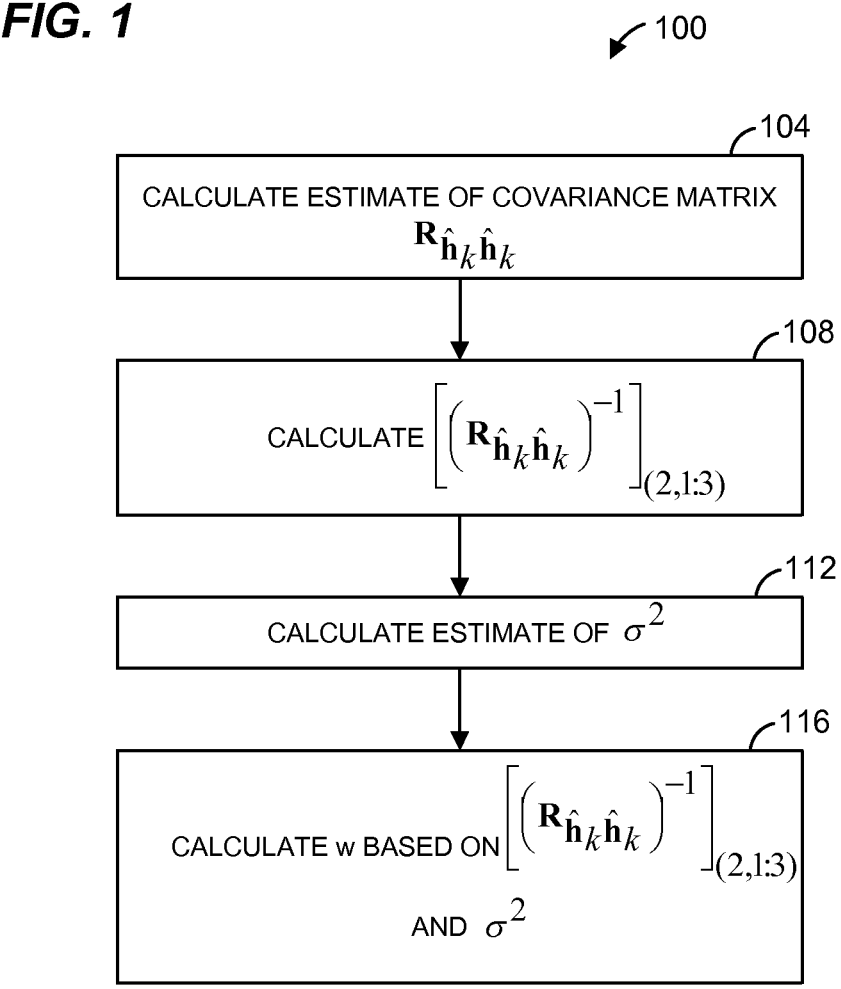
FIG. 1 is a flow diagram of an example method for generating weight coefficients for filtering sub-channel estimates.

While the antenna selection techniques described herein are in the context of communication systems that operate according to the IEEE 802.11a or 802.11g Standards, or the IEEE 802.11n Standard now being finalized, these techniques may be used in various other types of wired and wireless communication systems that utilize a plurality of sub-carriers or sub-bands and are not limited to those conforming to the IEEE 802.11a/802.11g/802.11n Standards. For example, the antenna selection techniques described herein may be utilized in other wired and wireless communication systems that utilize orthogonal frequency division multiplexing (OFDM).

A receiver in a wireless communication system that utilizes a plurality of sub-channels or sub-bands, such as in wireless systems that utilize OFDM, may periodically develop or collect channel state information (CSI) for each of the sub-channels. The CSI for a particular sub-channel may include the channel response (i.e., gain and phase) for the sub-channel. Additionally, if the communication system is a MIMO system, the receiver may develop multiple sub-channel responses corresponding to multiple receive antennas. The sub-channel responses may be developed based on the reception of known training signals. For example, in systems compliant with the IEEE 802.11a/802.11g/802.11n standards, transmitted data units include known pilot signals in a preamble of the data unit, and known training signals may also be transmitted in the data unit payload. Upon receiving a data unit with such training signals, the receiver may generate response estimates for the various sub-channels and antennas (if a MIMO system). Various techniques for generating the channel response estimates, including currently known techniques, can be utilized.

Noise in the communication system (e.g., additive noise) will introduce error into the channel response estimates, making the estimates less accurate. Thus, as the signal-to-noise ratio (SNR) for a sub-channel decreases, the accuracy of the sub-channel response estimates will tend to decrease. Because the channel response estimates are used for equalization, decreasing SNRs will lead to decreasing equalization performance. Similarly, because sub-channel response estimates can be used in techniques for extending the operating range of a wireless transceiver, such as beamforming, space-time block coding, etc., decreasing SNRs will lead to decreasing the effectiveness of such range extending techniques. Decreasing SNRs will also lead to decreasing accuracy of symbol timing synchronization.

Example methods and apparatus for improving the accuracy of channel response estimates are disclosed herein. By increasing the accuracy of the channel response estimates, performance of a transceiver can be improved by, for example, improving the performance of one or more of equalization, beamforming, space-time block coding, etc. Although the performance is improved when the SNR is low, such channel response estimation improvement techniques may also improve performance when the SNR is moderate to high.

In an OFDM system with N tones or sub-channels, the actual channel responses of the sub-channels can be represented as $h_k$, k=1, 2, ..., N. Similarly, the estimated channel responses can be represented as $\hat{h}_k$, k=1, 2, ..., N. The mean squared error (MSE) for the sub-channel estimate $\hat{h}_k$ is:

$$MSE = E\{|h_k - \hat{h}_k|^2\} = \sigma^2 \quad \text{(Equ. 1)}$$

where E{z} denotes the expected value of z. As will be described in further detail below, a smoothed or filtered sub-channel estimate $\tilde{h}_k$, which is calculated using a plurality of weighted sub-channel estimates (the plurality of weighted sub-channel estimates including a weighted version of the sub-channel estimate $\hat{h}_k$), will tend to reduce the MSE.

In one example implementation in which there are P contiguous (i.e., contiguous in frequency) sub-channels, k=1, 2, ..., P, each filtered sub-channel estimate $\tilde{h}_k$, except for the cases k=1 and k=P, is calculated as a weighted sum of three sub-channel estimates $\hat{h}_{k-1}$, $\hat{h}_k$ and $\hat{h}_{k+1}$, where weighting coefficients are $w_1$, $w_2$ and $w_3$, respectively. The weight coefficients $w_1$, $w_2$ and $w_3$ for a particular $\hat{h}_k$ are chosen in an attempt to minimize the MSE:

$$\arg\min_{w_1,w_2,w_3} = E\left\{\left|\sum_{l=-1}^{1} w_{l+2}\hat{h}_{k+l} - h_k\right|^2\right\} \quad \text{(Equ. 2)}$$

As will be described in further detail below, a smoothed or filtered sub-channel estimate $\tilde{h}_k$, which is calculated using a plurality of weighted sub-channel estimates (the plurality of weighted sub-channel estimates including a weighted version of the sub-channel estimate $\hat{h}_k$) will tend to reduce the MSE.

The weights $w_1$, $w_2$ and $w_3$ can be represented as a smoothing coefficient vector $w^T = [w_1\ w_2\ w_3]$. The minimum mean squared error (MMSE) solution of Equ. 2 is:

$$w^T = R_{h_k \hat{h}_k} R_{\hat{h}_k \hat{h}_k}^{-1} \quad \text{(Equ. 3)}$$

where $\hat{h}_k^T = [\hat{h}_{k-1}\ \hat{h}_k\ \hat{h}_{k+1}]$, and $R_{h_k \hat{h}_k}$ is a 1×3 covariance matrix:

$$R_{h_k \hat{h}_k} = E\{h_k \hat{h}_k^H\} \quad \text{(Equ. 4)}$$

and $R_{\hat{h}_k \hat{h}_k}$ is a 3×3 cross-covariance matrix:

$$R_{\hat{h}_k \hat{h}_k} = E\{R_{h_k \hat{h}_k}^H\} \quad \text{(Equ. 5)}$$

An estimate of the covariance matrix $R_{\hat{h}_k \hat{h}_k}$ can be calculated using a variety of covariance estimation techniques, including techniques currently known to those of ordinary skill in the art. For example, an estimate of the covariance matrix $R_{\hat{h}_k \hat{h}_k}$ can be calculated according to:

$$R_{\hat{h}_k \hat{h}_k} = \sum_{l=2}^{P-1} \hat{h}_l \hat{h}_{l+1}^H \quad \text{(Equ. 6)}$$

As another example, individual estimates of the covariance matrix $R_{\hat{h}_k \hat{h}_k}$ calculated over a plurality of different sets of contiguous sub-channels may be averaged to obtain an overall estimate.

The covariance matrix $R_{h_k \hat{h}_k}$ is related to the covariance matrix $R_{\hat{h}_k \hat{h}_k}$, and can be written as:

$$R_{h_k \hat{h}_k} = [R_{\hat{h}_k \hat{h}_k}]_{(2,1:3)} - [0\ \sigma^2\ 0] \quad \text{(Equ. 7)}$$

where $\sigma^2$ is the MSE of the channel estimate $\hat{h}_k$, and where $[R_{\hat{h}_k \hat{h}_k}]_{2,1:3}$ is the second row of $R_{\hat{h}_k \hat{h}_k}$. Because of the relation between the covariance matrices $R_{h_k \hat{h}_k}$ and $R_{\hat{h}_k \hat{h}_k}$, Equ. 3 can be simplified:

$$w^T = [0\ 1\ 0] - \sigma^2\left[\left(R_{\hat{h}_k \hat{h}_k}\right)^{-1}\right]_{(2,1:3)} \quad \text{(Equ. 8)}$$

As is known to those of ordinary skill in the art, calculation of only one row of the inverse of a matrix does not require calculation of the inverse of the matrix. Therefore, the calculation of $$\left[\left(R_{\hat{h}_k \hat{h}_k}\right)^{-1}\right]_{(2,1:3)}$$

does not require the calculation of $$\left(R_{\hat{h}_k \hat{h}_k}\right)^{-1}.$$

Thus, the smoothing coefficient vector w can be calculated without undue complexity and/or expense.

The channel estimation MSE, $\sigma^2$, can be estimated in a variety of ways, including ways currently known to those of ordinary skill in the art. For example, $\sigma^2$ can be estimated based on noise power estimates calculated based on received training signals.

FIG. 1 is a flow diagram of an example method 100 for calculating the smoothing coefficient vector w, where $w^T = [w_1\ w_2\ w_3]$. As discussed above, w may then be used for calculating a filtered sub-channel estimate $\tilde{h}_k$, where k may be a value between 2 and P−1. At block 104, an estimate of the covariance matrix $R_{\hat{h}_k \hat{h}_k}$ is generated. As discussed above, the estimate of the covariance matrix $R_{\hat{h}_k \hat{h}_k}$ can be calculated using a variety of covariance estimation techniques, including techniques currently known to those of ordinary skill in the art. In one example, the Equ. 6 can be utilized.

At block 108, the second row of the inverse of the estimated covariance matrix calculated at block 104 is generated. As discussed above, block 108 need not involve inverting the estimated covariance matrix calculated at block 104.

At block 112, an estimate of the channel estimation MSE, $\sigma^2$, is calculated. As discussed above, $\sigma^2$ can be estimated in a variety of ways, including ways currently known to those of ordinary skill in the art. For example, $\sigma^2$ can be estimated based on noise power estimates calculated based on received training signals.

At block 116, the results of block 108 and block 112 are used to calculate the smoothing coefficient vector w. For example, the smoothing coefficient vector w can be calculated according to Equ. 8.

Sub-channel response estimates that are on the edges of the set of P contiguous sub-channels (e.g., when k=1 or P), may be left unfiltered, or may be filtered using techniques similar to those described above. In one example implementation, each filtered sub-channel estimate $\tilde{h}_k$, for k=1 and k=P, is calculated as a weighted sum of two sub-channel estimates.

For instance, $\hat{\tilde{h}}_1$ can be calculated based on a weighted sum of $\hat{h}_1$ and $\hat{h}_2$. Similarly, $\hat{\tilde{h}}_P$ can be calculated based on a weighted sum of $\hat{h}_{P-1}$ and $\hat{h}_P$.

The smoothing coefficient vector $w_L$ for calculating $\hat{\tilde{h}}_1$ and smoothing coefficient vector $w_R$ for calculating $\hat{\tilde{h}}_P$ can be calculated in a manner similar to techniques described above. For instance, the smoothing coefficient vector $w_L$ can be calculated according to:

$$w_L^T = [1 \ 0] - \sigma^2 \left[ \left( \left[ R_{\hat{h}_k \hat{h}_k} \right]_{(1:2,1:2)} \right)^{-1} \right]_{(1,1:2)} \quad \text{(Equ. 9)}$$

Similarly, the smoothing coefficient vector $w_R$ can be calculated according to:

$$w_R^T = [0 \ 1] - \sigma^2 \left[ \left( \left[ R_{\hat{h}_k \hat{h}_k} \right]_{(2:3,2:3)} \right)^{-1} \right]_{(2,2:3)} \quad \text{(Equ. 10)}$$

Figure 2:
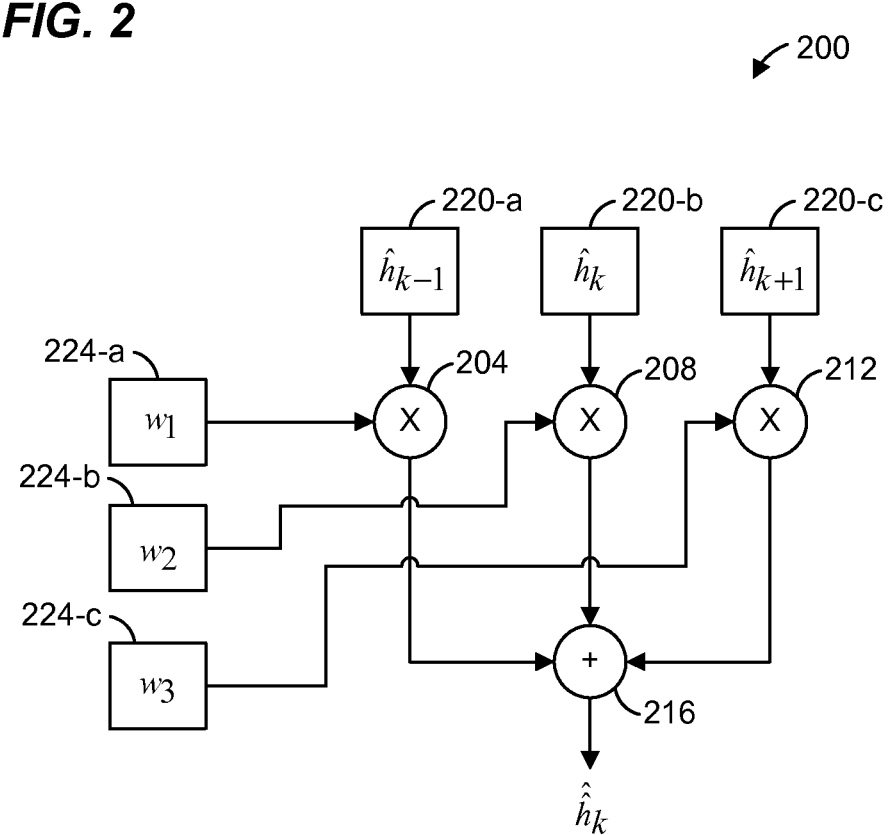
FIG. 2 is a block diagram of an example filter for generating a filtered sub-channel estimate.

FIG. 2 is a block diagram of an example filter 200 for generating a filtered sub-channel estimate $\hat{\tilde{h}}_k$, where k=2, 3, ..., or P−1, and where $\hat{\tilde{h}}_k$ is generated using three sub-channel estimates $\hat{h}_{k-1}$, $\hat{h}_k$ and $\hat{h}_{k+1}$. For each filtered sub-channel estimate $\hat{\tilde{h}}_k$ to be generated, the filter 200 receives three sub-channel estimates $\hat{h}_{k-1}$, $\hat{h}_k$ and $\hat{h}_{k+1}$, and three weight coefficients $w_1$, $w_2$ and $w_3$. The filter then generates the filtered sub-channel estimate $\hat{\tilde{h}}_k$ using the three sub-channel estimates $\hat{h}_{k-1}$, $\hat{h}_k$, $\hat{h}_{k+1}$ and the three weight coefficients $w_1$, $w_2$, $w_3$.

The filter 200 includes three multipliers 204, 208, 212 and a summing device 216. Each multiplier 204, 208, 212 receives a corresponding one of the sub-channel estimates $\hat{h}_{k-1}$, $\hat{h}_k$ and $\hat{h}_{k+1}$ and a corresponding one of the weight coefficients $w_1$, $w_2$ and $w_3$, and generates a corresponding product. For example, multiplier 204 receives $\hat{h}_{k-1}$ and $w_1$ and generates $w_1 \hat{h}_{k-1}$. Similarly, multiplier 208 receives $\hat{h}_k$ and $w_2$ and generates $w_2 \hat{h}_k$. Also, multiplier 212 receives $\hat{h}_{k+1}$ and $w_3$ and generates $w_3 \hat{h}_{k+1}$.

The summing device 216 receives the products generated by the multipliers 204, 208, 212 and sums the products to produce the filtered sub-channel estimate $\hat{\tilde{h}}_k$. In other words, the summing device 216 generates:

$$\hat{\tilde{h}}_k = w^T \hat{h}_k = [w_1 \ w_2 \ w_3] \begin{bmatrix} \hat{h}_{k-1} \\ \hat{h}_k \\ \hat{h}_{k+1} \end{bmatrix} \quad \text{(Equ. 11)}$$

The filter 200 can include storage units 220 to store the sub-channel estimates $\hat{h}_{k-1}$, $\hat{h}_k$ and $\hat{h}_{k+1}$, and storage units 224 to store the weight coefficients $w_1$, $w_2$ and $w_3$. In some implementations, however, the filter 200 need not include the storage units 220 and/or the storage units 224. For example, the filter 200 may receive the sub-channel estimates $\hat{h}_{k-1}$, $\hat{h}_k$ and $\hat{h}_{k+1}$ and/or the weight coefficients $w_1$, $w_2$ and $w_3$ as inputs without storing the sub-channel estimates $\hat{h}_{k-1}$, $\hat{h}_k$ and $\hat{h}_{k+1}$ and/or the weight coefficients $w_1$, $w_2$ and $w_3$.

The example filter 200 can be used for generating all P−2 filtered sub-channel estimates $\hat{\tilde{h}}_k$, for k=2, 3, ..., P−1. For example, the filter 200 can be used to generate P−2 filtered sub-channel estimates $\hat{\tilde{h}}_k$, for k=2, 3, ..., P−1, sequentially. Additionally, a filter system can include two or more filters 200 so that two or more sub-channel estimates $\hat{\tilde{h}}_k$ can be generated in parallel. For example, if P−2 filter 200 were included, then all P−2 filtered sub-channel estimates $\hat{\tilde{h}}_k$, for k=2, 3, ..., P−1, could be calculated in parallel.

The filter 200 can be modified in a straightforward manner to calculate the filtered sub-channel estimates $\hat{\tilde{h}}_1$ and $\hat{\tilde{h}}_P$ in light of the disclosure and teachings provided herein. For instance, for each of $\hat{\tilde{h}}_1$ and $\hat{\tilde{h}}_P$, the modified filter receives two sub-channel estimates and two weight coefficients. The modified filter then generates the filtered sub-channel estimate $\hat{\tilde{h}}_1$ or $\hat{\tilde{h}}_P$ using the two sub-channel estimates and the two weight coefficients. For example, the modified filter may generate:

$$\hat{\tilde{h}}_1 = w_L^T \begin{bmatrix} \hat{h}_1 \\ \hat{h}_2 \end{bmatrix} \quad \text{(Equ. 12)}$$

and $$\hat{\tilde{h}}_P = w_R^T \begin{bmatrix} \hat{h}_{P-1} \\ \hat{h}_P \end{bmatrix} \quad \text{(Equ. 13)}$$

In another implementation, the filter 200 can be modified in a straightforward manner to calculate all P filtered sub-channel estimates $\hat{\tilde{h}}_k$, for k=1, 3, ..., P, in light of the disclosure and teachings provided herein. For example, the weight input to the multiplier 204 or the weight input to multiplier 212 may be set to zero when calculating $\hat{\tilde{h}}_1$ or $\hat{\tilde{h}}_P$.

When filtered sub-channel estimates $\hat{\tilde{h}}_k$ are to be generated using more than three sub-channel estimates $\hat{h}_k$, the techniques and apparatus described above can be modified in a straightforward manner in light of the disclosure and teachings provided herein.

Figure 3:
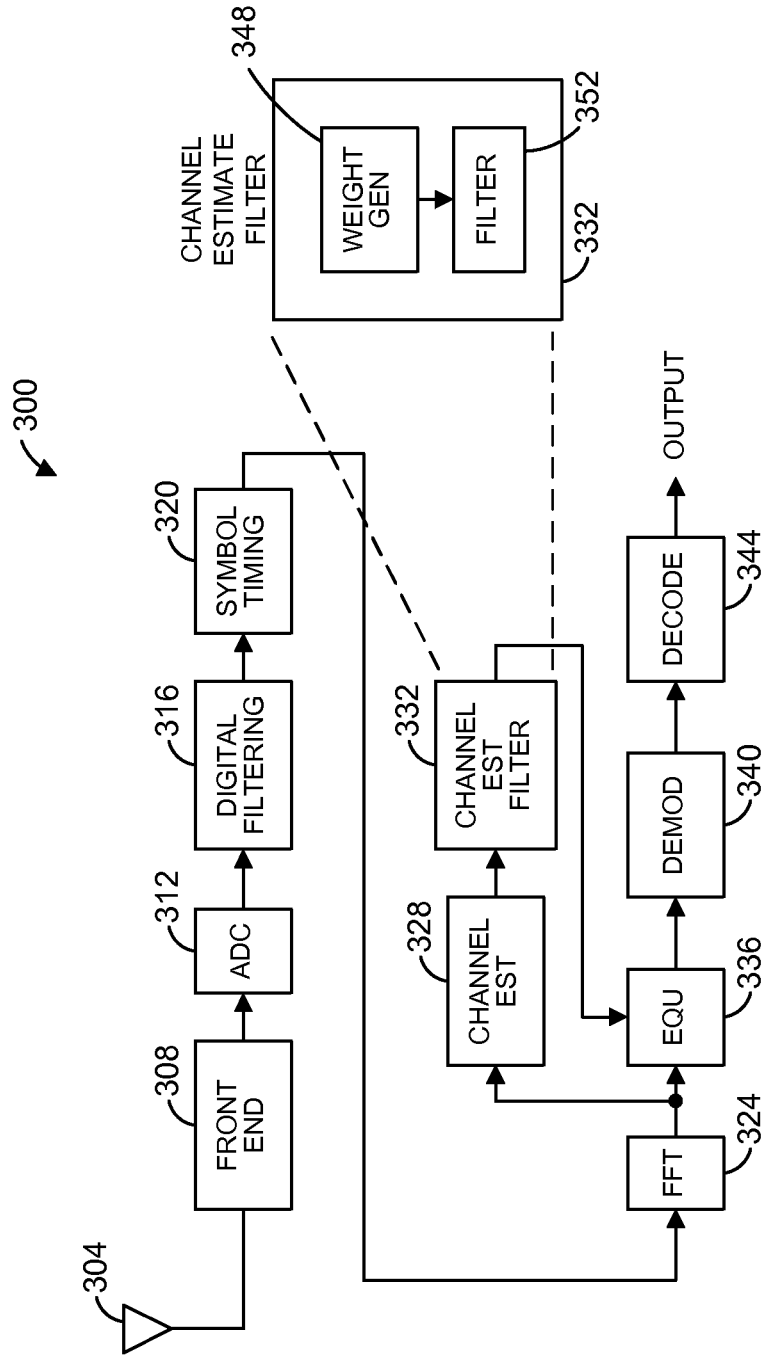
FIG. 3 is a block diagram of an example receiver that includes a channel estimate filter that can implement the method of FIG. 1 and/or include the filter of FIG. 2.

FIG. 3 is a block diagram of an example OFDM receiver device 300 that may generate and utilize filtered sub-channel estimates. The receiver 300 includes an antenna 304 coupled to an analog front end 308. The analog front end 308 generally downconverts a received signal from a carrier frequency to an intermediate frequency. An analog-to-digital converter (ADC) 312 is coupled to the analog front end 308. The ADC 312 converts an analog output of the front end 308 to a digital signal. A digital filtering unit 316 is coupled to the ADC 312 and performs filtering operations. A symbol timing unit 320 receives the output of the digital filtering unit 316 and generally identifies the start of OFDM symbols. A fast Fourier transform (FFT) unit 324 uses timing information from the symbol timing unit 320 and performs a discrete time Fourier transform operation on the digitally filtered signal.

The output of the FFT unit 324 comprises a plurality of signals corresponding to the plurality of OFDM sub-channels. A channel estimation unit 328 analyzes the output of the FFT unit 324 to generate a channel response estimate H. The channel response estimate H includes sub-channel estimates $\hat{h}_k$ for at least some of k, where k can vary from 1 to N. A channel estimate filter 332 receives the output of the channel estimation unit 328 and, for P contiguous sub-channel estimates $\hat{h}_k$, the channel estimation unit 328 generates a plurality of filtered sub-channel estimates $\hat{\tilde{h}}_k$. For example, P, P−2, or some other number less than P, filtered sub-channel estimates $\hat{\tilde{h}}_k$ may be generated. The plurality of filtered sub-channel estimates $\hat{\tilde{h}}_k$ generated by the channel estimate filter 332, and any sub-channel estimates generated by the channel estimation unit 328 and for which filtered sub-channel estimates were not generated, are provided to an equalization unit 336.

The equalization unit 336 utilizes the filtered sub-channel estimates ĥ$_k$ and, in some instances, sub-channel estimates h$_k$ to equalize the output of the FFT unit 324. A demodulator 340 converts the equalized output of the FFT unit 324 into a stream of bits, and a decoder 344 decodes the bits to generate output data.

The channel estimate filter 332 generates filtered sub-channel estimates, where each filtered sub-channel estimate is a weighted combination of a plurality of contiguous sub-channel estimates generated by the channel estimation unit 328. The channel estimate filter 332 uses weight coefficients in order to generate the filtered sub-channel estimates. For example, as discussed above, the weight coefficients may be generated to attempt to minimize the MSE channel estimation error. For instance, the channel estimate filter 332 can use the example methods for generating weight coefficients described above.

In one implementation, the channel estimate filter 332 includes a weight coefficient generator 348 and a filter 352. In this implementation, the weight coefficient generator 348 is configured to generate weight coefficients to attempt to minimize the MSE channel estimation error. For example, the weight coefficient generator 348 may be configured to implement the example methods for generating weight coefficients described above. If channel estimate filter 332 is configured to utilize three sub-channel response estimates to generate a filtered sub-channel response estimate, the weight coefficient generator 348 may implement the method 100 of FIG. 1. Of course, the weight coefficient generator 348 may implement other suitable methods for generating weight coefficients, and may be configured to generate more than three or only two weight coefficients for use by the filter 352, depending on the particular implementation.

The filter 352 utilizes the weight coefficients to generate filtered sub-channel response estimates. If channel estimate filter 332 is configured to utilize three sub-channel response estimates to generate a filtered sub-channel response estimate, the filter 352 may include the filter 200 of FIG. 2. Of course, the filter 352 may generate filtered sub-channel response estimates in a variety of suitable ways, and may be configured to utilize more than three or only two sub-channel response estimates to generate a filtered sub-channel response estimate.

If desired, various of the components of the receiver device 300 may be implemented in the same or in different hardware devices, such as in the same or different processors and/or on the same or different integrated circuits. Additionally, routines or instructions executed by a processor for implementing the functionality of any of these components that are implemented using a processor executing software or firmware instructions may be stored in a memory such as a memory included in or coupled to a controller or one or more other memories in the receiver device 300.

In receivers that include multiple receive antennas, there may be multiple channel estimate filters 332 corresponding to the multiple receive antennas. Additionally, the filtered channel estimates may be used by one or more of a beamforming unit, a space-time block coding unit, etc., instead of or in addition to being used by the equalizer 336.

Each of the method 100 of FIG. 1, the filter 200 of FIG. 2, and the channel estimate filter 332 of FIG. 3 may be implemented by hardware. More generally, however, the method 100, the filter 200, and the channel estimate filter 332 may be implemented using hardware, a processor executing firmware instructions, a processor executing software instructions, or any combination thereof. When a block is implemented at least partially using a processor that executes software instructions, the software may be stored in any computer readable memory such as on a magnetic disk, an optical disk, or other storage medium, in a RAM or ROM or flash memory of a computer, processor, hard disk drive, optical disk drive, tape drive, etc. Likewise, the software may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software may be delivered to a user or a system via a communication channel such as a telephone line, a DSL line, a cable television line, a wireless communication channel, the Internet, etc. (which are viewed as being the same as or interchangeable with providing such software via a transportable storage medium). When implemented in hardware, the hardware may comprise one or more of discrete components, an integrated circuit, an application-specific integrated circuit (ASIC), etc.

Moreover, while the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

What is claimed is:

1. A method, comprising:
    determining a plurality of sub-channel response estimates corresponding to a plurality of sub-channels in a communication channel;
    determining, with a communication device, a plurality of weight coefficients to be used in generating a filtered sub-channel response estimate for a first sub-channel of the plurality of sub-channels in the communication channel, wherein the plurality of weight coefficients are determined according to a minimum mean square error (MSE) technique with respect to an error between (i) the filtered sub-channel response estimate generated using the plurality of weight coefficients, and (ii) an actual sub-channel response corresponding to the filtered sub-channel response estimate;
    generating, with the communication device, the filtered sub-channel response estimate using (i) the plurality of sub-channel response estimates and (ii) the plurality of weight coefficients; and
    using the filtered sub-channel response estimate to perform, with the communication device, one or both of (i) beamforming, or (ii) equalization.

2. The method according to claim 1, wherein the plurality of sub-channels include at least one sub-channel higher in frequency than the first sub-channel.

3. The method according to claim 2, wherein the plurality of sub-channels include at least one sub-channel lower in frequency than the first sub-channel.

4. The method according to claim 1, wherein the plurality of sub-channels include at least one sub-channel lower in frequency than the first sub-channel.

5. The method according to claim 1, wherein determining the plurality of weight coefficients comprises:
   determining an estimate of a covariance of the plurality of sub-channel response estimates; and
   determining the plurality of weight coefficients using the estimate of the covariance.

6. The method according to claim 5, wherein:
   the estimate of the covariance comprises a matrix, and
   determining the plurality of weight coefficients using the estimate of the covariance comprises calculating a row of the inverse of the matrix.

7. The method according to claim 6, wherein calculating the row of the inverse of the matrix is performed without calculating the inverse of the matrix.

8. The method according to claim 1, wherein determining the plurality of weight coefficients comprises:
   determining an estimate of a mean squared error (MSE) of a sub-channel response estimate corresponding to the filtered sub-channel response estimate; and
   determining the plurality of weight coefficients using the estimate of the MSE of the sub-channel estimate.

9. The method according to claim 1, wherein determining the plurality of weight coefficients comprises determining three weight coefficients;
   wherein multiplying the plurality of sub-channel response estimates with the plurality of weight coefficients comprises multiplying sub-channel response estimates $\hat{h}_{k-1}$, $\hat{h}_k$ and $\hat{h}_{k+1}$ each with a respective one of the three weight coefficients, wherein k is a sub-channel index equal to one integer of the set of integers 2, 3, . . . , P−1, and wherein P is the number of sub-channels in the plurality of sub-channels; and
   wherein the filtered sub-channel response estimate is for the k-th sub-channel.

10. The method according to claim 1, wherein determining the plurality of weight coefficients comprises determining more than three weight coefficients; and
   wherein multiplying the plurality of sub-channel response estimates with the plurality of weight coefficients comprises multiplying more than three sub-channel response estimates with the more than three weight coefficients to generate more than three weighted sub-channel response estimates.

11. The method according to claim 1, wherein determining the plurality of weight coefficients comprises determining only two weight coefficients; and
   wherein multiplying the plurality of sub-channel response estimates with the plurality of weight coefficients comprises multiplying only two sub-channel response estimates with the only two weight coefficients to generate only two weighted sub-channel response estimates.

12. The method according to claim 1, wherein generating the filtered sub-channel response estimate comprises using a different number of weight coefficients and a different number of sub-channel response estimates to generate the filtered sub-channel response estimate depending on whether the filtered sub-channel response estimate corresponds to a sub-channel at an edge of the communication channel.

13. An apparatus, comprising:
   a channel estimator to determine a plurality of sub-channel response estimates corresponding to a plurality of sub-channels in a communication channel; and
   a channel estimate filter to generate filtered sub-channel response estimates, the channel estimate filter including
      a weight coefficient generator to generate a plurality of weight coefficients to be used in generating filtered sub-channel response estimates, wherein the plurality of weight coefficients are determined such that, when filtered sub-channel response estimates are generated using the plurality of weight coefficients, a respective mean square error (MSE) between each filtered sub-channel response estimate and the respective actual sub-channel response is minimized, and
      a filter to generate the filtered sub-channel response estimates using (i) the plurality of weight coefficients and (ii) the plurality of sub-channel response estimates; and
   at least one of (i) an equalizer configured to utilize the filtered sub-channel response estimates, or (ii) a beamforming unit configured to utilize the filtered sub-channel response estimates.

14. The apparatus according to claim 13, wherein the weight coefficient generator is configured to:
   determine an estimate of a covariance of a set of sub-channel response estimates used to generate one filtered sub-channel response estimate; and
   determine a set of weight coefficients using the estimate of the covariance.

15. The apparatus according to claim 14, wherein:
   the estimate of the covariance comprises a matrix, and
   the weight coefficient generator is configured to determine the set of weight coefficients at least by calculating a row of the inverse of the matrix.

16. The apparatus according to claim 15, wherein the weight coefficient generator is configured to calculate the row of the inverse of the matrix without calculating the inverse of the matrix.

17. The apparatus according to claim 13, wherein the filter comprises:
   a plurality of multipliers to multiply a set of weight coefficients with a set of sub-channel response estimates, respectively; and
   a summing device to sum outputs of the plurality of multipliers to generate a corresponding filtered sub-channel response estimate.

18. The apparatus according to claim 13, wherein the channel estimate filter is configured to use a different number of weight coefficients and a different number of sub-channel response estimates to generate a particular filtered sub-channel response estimate depending on whether the particular filtered sub-channel response estimate corresponds to a sub-channel at an edge of the communication channel.

19. A non-transitory computer readable storage medium having stored thereon instructions that, when executed by one or more processors, cause the one or more processors to:
   determining a plurality of sub-channel response estimates corresponding to a plurality of sub-channels in a communication channel;
   determine a plurality of weight coefficients to be used in generating a filtered sub-channel response estimate for a first sub-channel of a plurality of sub-channels in a communication channel, wherein the plurality of weight coefficients are determined according to a minimum mean square error (MSE) technique with respect to an error between (i) the filtered sub-channel response estimate generated using the plurality of weight coefficients, and (ii) an actual sub-channel response corresponding to the filtered sub-channel response estimate; and
   generate the filtered sub-channel response estimate using (i) the plurality of sub-channel response estimates and (ii) the plurality of weight coefficients.

20. The non-transitory computer readable storage medium of claim 19, further having stored thereon instructions that, when executed by one or more processors, cause the one or more processors to:
   determine an estimate of a covariance of the plurality of sub-channel response estimates; and
   determine the plurality of weight coefficients using the estimate of the covariance.

21. The non-transitory computer readable storage medium of claim 20, further having stored thereon instructions that, when executed by one or more processors, cause the one or more processors to:
   determine the plurality of weight coefficients using the estimate of the covariance at least by calculating a row of the inverse of a matrix corresponding to the covariance.

22. The non-transitory computer readable storage medium of claim 21, further having stored thereon instructions that, when executed by one or more processors, cause the one or more processors to calculate the row of the inverse of the matrix without calculating the inverse of the matrix.

* * * * *